(Model.)

J. BINKLEY.
Coffee and Tea Pot.

No. 226,899. Patented April 27, 1880.

Witnesses:
Zelora Phillips
G. H. Rennett

Inventor:
John Binkley
Per E. H. Knight
his attorney

UNITED STATES PATENT OFFICE.

JOHN BINKLEY, OF INDIANAPOLIS, INDIANA, ASSIGNOR TO HIMSELF AND BENJAMIN F. McCREADY, OF SAME PLACE.

COFFEE AND TEA POT.

SPECIFICATION forming part of Letters Patent No. 226,899, dated April 27, 1880.

Application filed March 2, 1880. (Model.)

*To all whom it may concern:*

Be it known that I, JOHN BINKLEY, of Indianapolis, in the county of Marion and State of Indiana, have invented a new and useful Improvement in Coffee and Tea Pots, of which the following is a specification.

My invention relates to improvements in coffee and tea pots in which a vertically three-sided trough is attached to the top and bottom connections of the handle and the sides and top of the trough are soldered fast to the outside of the cylindrical part of the vessel, with an opening through the side of the vessel near the upper end of the trough; and the objects of my improvements are, first, to strengthen the cylinder of the vessel where the handle is attached; second, to afford facilities for the passage of cold air through the trough or air-tube into the upper part of the cylinder above the liquid contents, for the purpose of assisting the condensation of the vapors in the pot.

These objects I attain by the mechanism illustrated in the accompanying drawings, in which—

Figure 1:
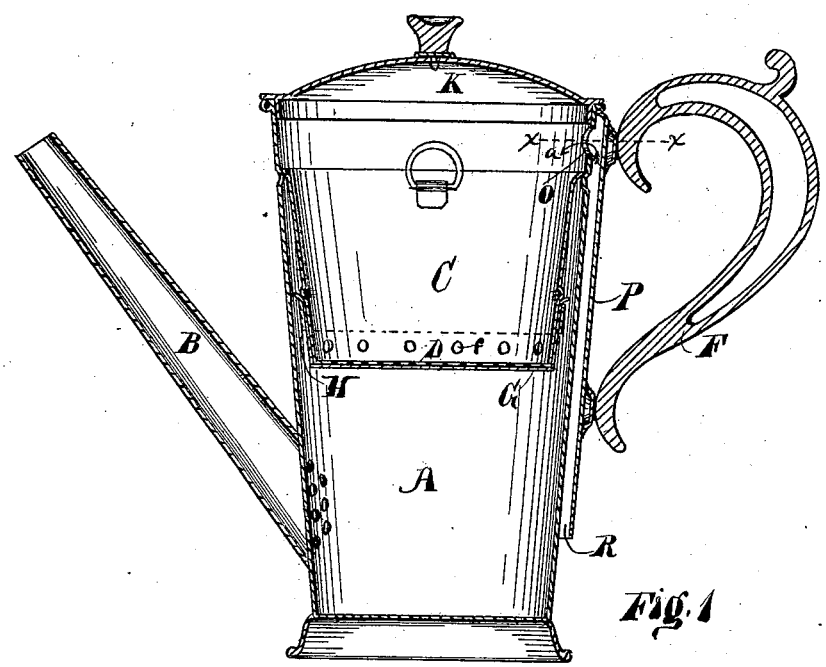
Figure 2:
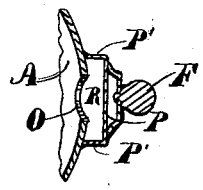

Figure 1 represents a vertical section of a coffee or tea pot embodying my invention. Fig. 2 is cross-section of that part marked $xx$ of Fig. 1.

Like letters refer to similar parts in the several views.

A represents the cylinder of an ordinary coffee or tea pot, provided with a spout, B, and a cover, K, in the usual manner. Inside of the cylinder is located a strainer composed of the cylinder C, having the perforated bottom D, and perforations $f$ in the lower part of the cylinder. Below the perforated bottom D is secured a cloth strainer, G, which is held in place by the ring H on the outside of the straining-cylinder C, as shown.

The handle F is of any ordinary form. The upper and lower ends of this handle are soldered fast to the trough P. The trough P has a form in cross-section similar to that shown in Fig. 2, the sides P' P' and top being soldered fast to the outer surface of the pot-cylinder A, thus strengthening the cylinder and forming an air-tube, R, the lower end of which tube is open and the upper end closed, and a connection with the interior of the pot-cylinder near the top is formed by the aperture O, as shown in the drawings, thus permitting cold air to enter the bottom of the air-tube R, pass up on the outside of the pot-cylinder, and enter the cylinder through the hole O, for condensing the vapors above the contents of the pot.

Having thus described my invention, what I claim is—

1. As an article of manufacture, the handle F, provided with a trough, P P' P', soldered fast thereto, as described.

2. In combination with the handle F, provided with a trough, P P' P', the pot-cylinder A, provided with a hole, O, near its top, whereby an external-air tube, R, is formed with a connection to the inside of the pot-cylinder, substantially as specified.

In testimony whereof I have signed my name to this specification in the presence of two subscribing witnesses.

JOHN BINKLEY.

Witnesses:
E. O. FRINK,
G. W. RENNETT.